(12) United States Patent
Blaak et al.

(10) Patent No.: US 12,237,684 B2
(45) Date of Patent: Feb. 25, 2025

(54) METHOD FOR DYNAMIC CLUSTERING OF ELECTRICAL INSTALLATIONS, IN PARTICULAR FOR RENDERING ANCILLARY SERVICES

(71) Applicant: Wobben Properties GmbH, Aurich (DE)

(72) Inventors: Isabel Blaak, Alfter (DE); Johannes Brombach, Berlin (DE)

(73) Assignee: WOBBEN PROPERTIES GMBH, Aurich (DE)

( * ) Notice: Subject to any disclaimer, the term of this patent is extended or adjusted under 35 U.S.C. 154(b) by 500 days.

(21) Appl. No.: 17/538,111

(22) Filed: Nov. 30, 2021

(65) Prior Publication Data
US 2022/0173596 A1 Jun. 2, 2022

(30) Foreign Application Priority Data
Nov. 30, 2020 (EP) .................................. 20210710

(51) Int. Cl.
 *H02J 3/38* (2006.01)
 *H02J 3/06* (2006.01)
(52) U.S. Cl.
 CPC ............... *H02J 3/381* (2013.01); *H02J 3/06* (2013.01); *H02J 2300/28* (2020.01)
(58) Field of Classification Search
 CPC ..................................................... H02J 3/381
 USPC ........................................................ 307/43
 See application file for complete search history.

(56) References Cited

U.S. PATENT DOCUMENTS

| | | |
|---|---|---|
| 2002/0087234 A1 | 7/2002 | Lof et al. |
| 2005/0042098 A1 | 2/2005 | Wobben |
| 2009/0254223 A1 | 10/2009 | Helle et al. |
| 2012/0010755 A1 | 1/2012 | Stapelfeldt |
| 2012/0130556 A1* | 5/2012 | Marhoefer ............. G05B 15/02 700/291 |
| 2015/0003945 A1 | 1/2015 | Takahashi et al. |
| 2015/0345468 A1 | 12/2015 | Schubert |
| 2016/0131109 A1 | 5/2016 | Busker |
| 2017/0054301 A1 | 2/2017 | Fintzos et al. |
| 2019/0036344 A1 | 1/2019 | Beekmann et al. |
| 2021/0301786 A1 | 9/2021 | Brombach et al. |

FOREIGN PATENT DOCUMENTS

| | | |
|---|---|---|
| CN | 101542864 A | 9/2009 |
| CN | 106537759 A | 3/2017 |
| CN | 107332241 A | 11/2017 |
| DE | 10-2012-210613 A1 | 12/2013 |

(Continued)

*Primary Examiner* — Joseph Chang
(74) *Attorney, Agent, or Firm* — Seed IP Law Group LLP (57) ABSTRACT

A method for controlling an electrical distribution grid, comprising the following steps: determining at least one variable which describes a state of the electrical distribution grid; combining a plurality of electrical installations, in particular a plurality of regenerative generating units, of the electrical distribution grid to form a virtual power plant, in particular taking into consideration the variable; establishing a control area within the electrical distribution grid for the virtual power plant; establishing a control unit of an electrical installation of the virtual power plant as main control unit; controlling the control area using the main control unit of the virtual power plant.

10 Claims, 4 Drawing Sheets

(56) References Cited

FOREIGN PATENT DOCUMENTS

| | | |
|---|---|---|
| DE | 10-2013-222277 A1 | 9/2014 |
| DE | 10-2015-102430 A1 | 8/2016 |
| DE | 102016105662 A1 | 10/2017 |
| DE | 102018125529 A1 | 4/2020 |
| WO | 03/030329 A1 | 4/2003 |
| WO | 2016/120240 A1 | 8/2016 |
| WO | 2019/178146 A1 | 9/2019 |
| WO | 2020/226639 A1 | 11/2020 |

* cited by examiner

METHOD FOR DYNAMIC CLUSTERING OF ELECTRICAL INSTALLATIONS, IN PARTICULAR FOR RENDERING ANCILLARY SERVICES

BACKGROUND

Technical Field

The present invention relates to a method for controlling an electrical distribution grid.

Description of the Related Art

Electrical distribution grids, such as, for example, the German transmission grid or the synchronous grid of Continental Europe, and their system management, in particular by a grid operator, are generally known.

Inter alia, the grid operator, for the system management, categorizes the electrical distribution grid into rigid zones, so-called control zones.

One disadvantage with such a system management, which is based on rigid control zones, is in particular that any ancillary services (AS for short) can only be met to a certain extent or cannot be provided for other control zones.

In this case, ancillary services should be understood to mean in particular all of those services which are required for the power supply quality of an electrical distribution grid which grid operators additionally render in addition to the transmission and distribution of electrical energy. Such services are, inter alia, frequency stability of the line frequency, voltage stability, power supply recovery, system management or grid bottleneck management.

BRIEF SUMMARY

Provided are one or more techniques for an improved controllability of an electrical distribution grid which improves the rendering of ancillary services.

Provided is a method for controlling an electrical distribution grid is proposed, comprising the following steps: determining at least one variable which describes a (grid) state of the electrical distribution grid; combining a plurality of electrical installations, in particular a plurality of regenerative generating units, of the electrical distribution grid to form a virtual power plant; establishing a control area within the electrical distribution grid for the virtual power plant; establishing a control unit of an electrical installation of the virtual power plant as main control unit; controlling the control area using the main control unit of the virtual power plant.

A method for dynamic clustering of electrical installations, in particular for rendering ancillary services, is therefore in particular proposed.

In a first step, for this purpose, a grid state of the electrical distribution grid is determined by means of at least one variable.

In this case, a grid state is understood to mean in particular all variables describing the electrical distribution grid which at least regionally describe the electrical distribution grid.

The variable describing the electrical distribution grid therefore in particular reflects an item of information on a, preferably present, state of the electrical distribution grid, for example whether an (n−1) criterion has been met, an extension of the electrical distribution grid, a present total load on the electrical distribution grid, a number of subordinate grid levels, a proportion of controllable parts of the electrical distribution grid, a type of electrical distribution grid, for example meshed, ring or radial, and/or a present injection by the, in particular all of the, generating units.

In a further step, a plurality of electrical installations, in particular a plurality of regenerative generating units, of the electrical distribution grid are combined to form a virtual power plant.

Herein, an electrical installation is in particular understood to mean combinations of electrical operating means which, as a whole or in individual parts, serve to utilize electrical energy, i.e. in particular to generate, distribute and store energy. This should be understood to include in particular also all of those injecting units, i.e. generating units, stores and converters, which are set up to exchange electrical power with an electrical power supply grid, in particular by means of an inverter. Therefore, the electrical installations described herein are in particular wind power installations, photovoltaic installations, electrical stores and further inverter-based grid installations, such as, for example, STATCOMS (static synchronous compensator) or FACTS (flexible AC transmission system), and combinations thereof.

In particular, in this case the possibilities for control, for example nature, quality or whether controllable at all, of these installations should also be taken into consideration in the assembly.

It is therefore in particular proposed to combine a plurality of electrical installations, preferably wind power installations, to form a functional unit, in particular to form a virtual power plant.

In a further step, a control area within the electrical distribution grid is established for which the virtual power plant is responsible.

Preferably, the virtual power plant, and in particular all of the electrical installations of the virtual power plant, is within this control area.

The control area can in this case be established both prior to and after the combination of the electrical installations to form the virtual power plant.

Preferably, the control area is established prior to the combining of the electrical installations to form the virtual power plant and taking into consideration at least one variable which describes a state of the electrical distribution grid.

Such a variable may be, for example, a total grid load.

It is therefore in particular proposed to perform, dynamically, a grid-state-appropriate aggregation within an electrical distribution grid in order to provide ancillary services.

In a further step, therefore in particular after the grid-state-appropriate aggregation, a control unit of an electrical installation of the virtual power plant is established as main control unit.

A control unit of an electrical installation of the virtual power plant is therefore allocated the function of a master controller.

This control unit then acts as master of all of the electrical installations within the virtual power plant and preferably all of the electrical installations of the control area, i.e. in particular of all of the generating units, storage systems and loads of the control area.

The established control area is therefore in particular controlled by a control unit of an electrical installation which is designed as main control unit of the virtual power plant.

Preferably, the above-described steps, in particular the determination of the at least one variable which describes a state of the electrical distribution grid; the combining of the plurality of electrical installations to form the virtual power plant; the establishing of the control area within the electrical distribution grid for the virtual power plant and the control of the control area using the main control unit of the virtual power plant, are repeated.

Therefore, in particular a dynamic method is proposed in which the control area and/or the virtual power plant are continuously determined again corresponding to the prevailing conditions, in particular the grid state, for example determined again every 30 minutes.

For this purpose, the method steps described above or below are repeated continuously and/or iteratively.

As an alternative or in addition, the main control unit is additionally established, in particular likewise dynamically, and in particular repeatedly newly.

Preferably, the main control unit is designed and/or set up to preset setpoint values for further control units, in particular of generating units and/or consumers and/or storage systems within the virtual power plant, in order to control the virtual power plant.

The control unit of an electrical installation which has been established as main control unit is therefore in particular designed and/or set up to operate as master controller of the virtual power plant.

The aggregation and the control of the virtual power plant can therefore take place, for example, by means of a wind farm controller, which acts as master for the other generating units, storage systems and loads.

Preferably, the main control unit is designed and/or set up to communicate with a control unit of a grid operator or marketer of the electrical distribution grid, preferably exclusively and/or for the virtual power plant.

The control unit of an electrical installation which has been established as main control unit therefore communicates in particular exclusively and representatively for the virtual power plant or the control area with the grid operator of the electrical distribution grid.

Only the main control unit therefore communicates with the management system of the grid operator or the AS marketer and gives any control commands to the further installations of the virtual power plant.

Preferably, the main control unit is designed and/or set up to process at least one of the following parameters from a list consisting of:
  operating state of an electrical installation, in particular of the virtual power plant;
  availability and prognosis of the ancillary service to be rendered by an electrical installation, in particular of the virtual power plant, for example a primary control reserve or a minute reserve;
  present active and/or reactive power of an electrical installation, in particular of the virtual power plant;
  available active power of an electrical installation, in particular of the virtual power plant;
  available reactive power of an electrical installation, in particular of the virtual power plant;
  prognosis of available power and schedule of the control area;
  SOC (state of charge) value of connected storage systems, wherein the SOC value describes the so-called state of charge of an electrical store.

The main control unit is therefore in particular set up to control the total control area or all of the generating units of the control area in such a way that the control area has a maximum of ancillary services.

Preferably, the main control unit is designed and/or set up to preset setpoint values for further control units, in particular of electrical installations of the virtual power plant, in particular taking into consideration at least one of the following values from a list consisting of:
  installation power, in particular installed wind farm power;
  capacity utilization by other ancillary services;
  priority of other ancillary services;
  available active power and/or reserve up to the available power;
  rid sensitivity and/or grid capacity utilization;
  sensitivity at a point to be subjected to closed-loop control, in particular the location of the virtual power plant, in particular for raising the voltage within the control area;
  prognosis of an available power.

It is therefore in particular proposed that the main control unit presets setpoint values for other control units of electrical installations within the control area, in particular taking into consideration the values and/or parameters described above or below.

Preferably, the plurality of electrical installations is designed as a wind power installation and/or wind farm and/or the combining of the plurality of generating units takes place depending on a variable of a control area for which the virtual power plant is responsible.

Preferably, the method further comprises the following steps: performing an, in particular automatic, topological investigation of the electrical distribution grid, in particular in respect of a grid structure, and performing switching operations within the electrical distribution grid taking into consideration the topological investigation, in particular in such a way that a grid state is maintained.

It is therefore in particular proposed that, during the implementation of the method described above or below, a topological investigation, in particular of the control area, is performed, by means of which switches or switchgear assemblies are actuated in such a way that an, in particular the predetermined, grid state is maintained.

The investigation can take place, for example, by means of measuring unit or computer programs.

In addition a method for controlling an, in particular regenerative, generating unit within an electrical distribution grid is proposed, comprising the following steps: receiving an electrical location of the control area, in particular from the main control unit; receiving a setpoint value, in particular from the main control unit, which presets a setpoint value for an active and/or reactive power to be injected; determining an electrical distance between the generating unit and the control node; exchanging an electrical active and/or reactive power with the electrical distribution grid depending on the setpoint value and the electrical distance.

In this case, the generating unit is in particular in the form of a wind power installation or preferably in the form of a wind farm.

In a first step, the generating unit receives a communication, for example from a grid operator, in respect of the point in the electrical distribution grid, in particular within the control area, at which control is intended to take place.

It is therefore in particular also proposed that in particular the electrical installations of the virtual power plant which are in the form of generating units are located within the control area of the virtual power plant and/or are operationally ready and/or have a voltage at the installation terminals, which are connected to the electrical distribution grid.

The control then takes place via the management system of the grid operator or preferably by a main control unit as described above or below of a further electrical installation of the virtual power plant.

In a next step, a setpoint value is received from the main control unit, for example by the installation control unit.

Preferably, the setpoint value is a setpoint value for an active and/or reactive power to be injected.

In addition, the generating unit determines an electrical distance between the generating unit and the received electrical location. The electrical location can to this extent also be understood as being a control node, at which the generating unit performs closed-loop control.

Depending on the setpoint value and this electrical distance, the generating unit then exchanges active and/or reactive power with the electrical distribution grid in such a way that this preferably results in the voltage being raised at the electrical location.

Therefore, what is proposed in particular is an exchange of an electrical active and/or reactive power with the electrical distribution grid depending on the setpoint value and the electrical distance.

Preferably, the electrical distribution grid is controlled by means of a method as described above or below.

Preferably, the exchange of the active and/or reactive power with the electrical distribution grid takes place taking into consideration a sensitivity of the electrical distribution grid and/or a degree of freedom of the electrical distribution grid.

The electrical installations, in particular the generating units, of the virtual power plant are therefore preferably set up, for example by means of a control unit, to detect a sensitivity of the electrical distribution grid and/or a degree of great freedom of the electrical distribution grid and, taking into consideration the latter, to exchange active and/or reactive power with the electrical distribution grid.

In addition a wind power installation is proposed, comprising a wind power installation control unit, which is set up to implement a method as described above or below for controlling a generating unit and/or to communicate with a main control unit which implements a method as described above or below for controlling a distribution grid.

A wind farm which comprises at least one wind power installation as described above and/or a wind farm control unit, which is set up to implement a method as described above or below for controlling a generating unit and/or to communicate with a main control unit which implements a method as described above or below for controlling an electrical distribution grid is also proposed.

Preferably, the wind farm control unit is set up to form a main control unit as described above or below.

BRIEF DESCRIPTION OF THE SEVERAL VIEWS OF THE DRAWINGS

The present invention will now be explained in more detail below by way of example using exemplary embodiments with reference to the attached figures, wherein the same reference symbols are used for identical or similar assemblies.

DETAILED DESCRIPTION

Figure 1:
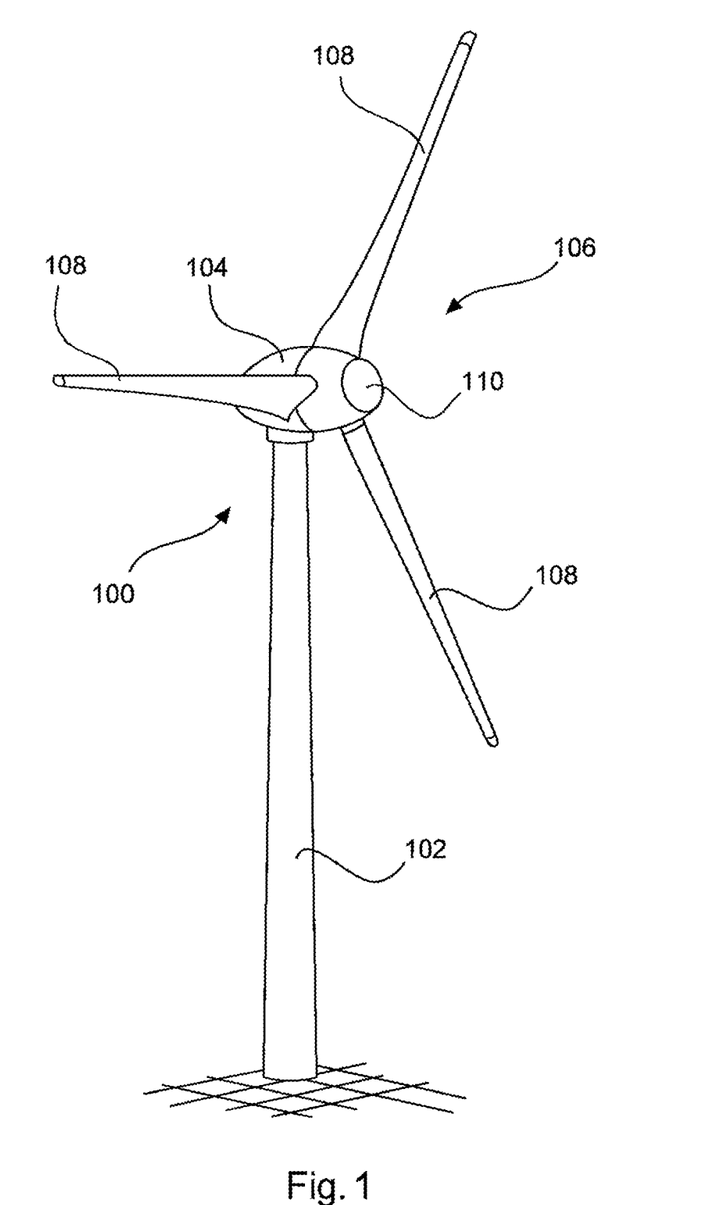
FIG. 1 shows a schematic view of a wind power installation in accordance with one embodiment.

FIG. 1 shows a schematic view of a wind power installation 100 in accordance with one embodiment.

The wind power installation 100 has a tower 102 and a nacelle 104.

An aerodynamic rotor 106 having three rotor blades 108 and a spinner 110 is arranged on the nacelle 104.

The rotor 106, during operation, is set in rotary motion by the wind and thereby drives a generator in the nacelle 104.

In addition, the generator is connected to a power converter, in particular as described above or below, by means of which the wind power installation exchanges electrical power with an electrical power supply grid.

The wind power installation is therefore in particular in the form of an inverter-based injecting unit or generator.

In order to operate the wind power installation, and in particular the power converter, in addition a controller as described above or below is provided, in particular in order to implement a method as described above or below for controlling a generator and/or in order to contribute to a method as described above for controlling an electrical distribution grid.

Figure 2:
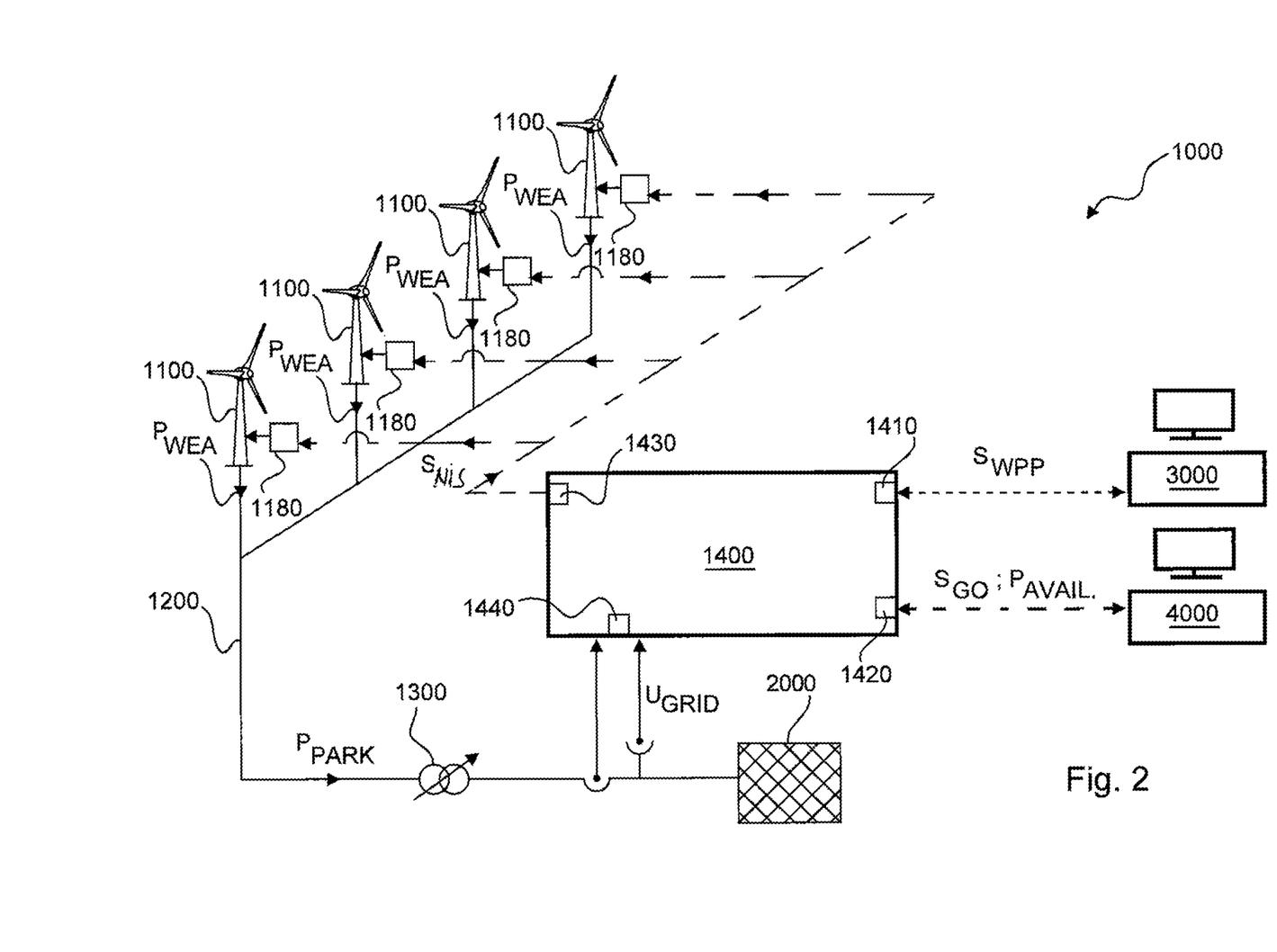
FIG. 2 shows a schematic view of a wind farm in accordance with one embodiment.

FIG. 2 shows a schematic design of a wind farm 1000 in accordance with one embodiment.

The wind farm 1000 comprises a multiplicity of wind power installations 1100, as shown, for example, in FIG. 1, which are connected to one another via a common wind farm grid 1200.

The wind farm grid 1200 is connected to an electrical distribution grid 2000 by means of a wind farm transformer 1300 in order to inject, for example, an electrical wind farm power Pfarm into the electrical distribution grid 2000.

The electrical wind farm power Pfarm is composed of the individual electrical wind power installation powers Pwpi.

The wind power installation 1100 and the wind farm grid 1200 together with the wind farm transformer 1300 form the power string (continuous lines), i.e. in particular those assemblies which are responsible for the transport of energy into the electrical distribution grid.

In addition, the wind farm 1000 has a wind farm controller 1400, which is set up to control the wind farm 1000.

For this purpose, the wind farm controller 1400 is in particular connected to the wind power installation controllers 1180 of the wind power installations 1100.

The wind farm 1000 therefore has, in addition to the power string (continuous lines), also a control and control system string (dashed lines), which will be described below.

The wind farm controller 1400 has a multiplicity of interfaces 1410, 1420, 1430, 1440 and a multiplicity of operating modes B1, B2, B3, such as, for example, a fault-case regulation, and is preferably in the form of a main controller as described above or below.

The interface 1410 is set up to transmit signals to other controllers, in particular to electrical installations which are associated likewise with the same virtual power plant. This interface 1410 can also be referred to as command interface, in particular of the virtual power plant.

The interface 1420 is set up to transmit signals SGO to a grid operator 4000 or to receive said signals from said grid operator. This interface 1420 can also be referred to as grid operator interface.

The driving of the individual wind power installations 1100 of the wind farm 1000 takes place via a control interface 1430, which is connected to the individual wind power installation controllers 1180, for example by means of various control signals SNIS.

By means of the interface 1440, the wind farm controller 1400 can detect the injection by the wind farm and/or a voltage Ugrid on the electrical power supply grid 2000. This interface 1440 can also be referred to as measurement interface.

The wind farm controller 1400 is set up to act as main controller as described above or below.

Figure 3:
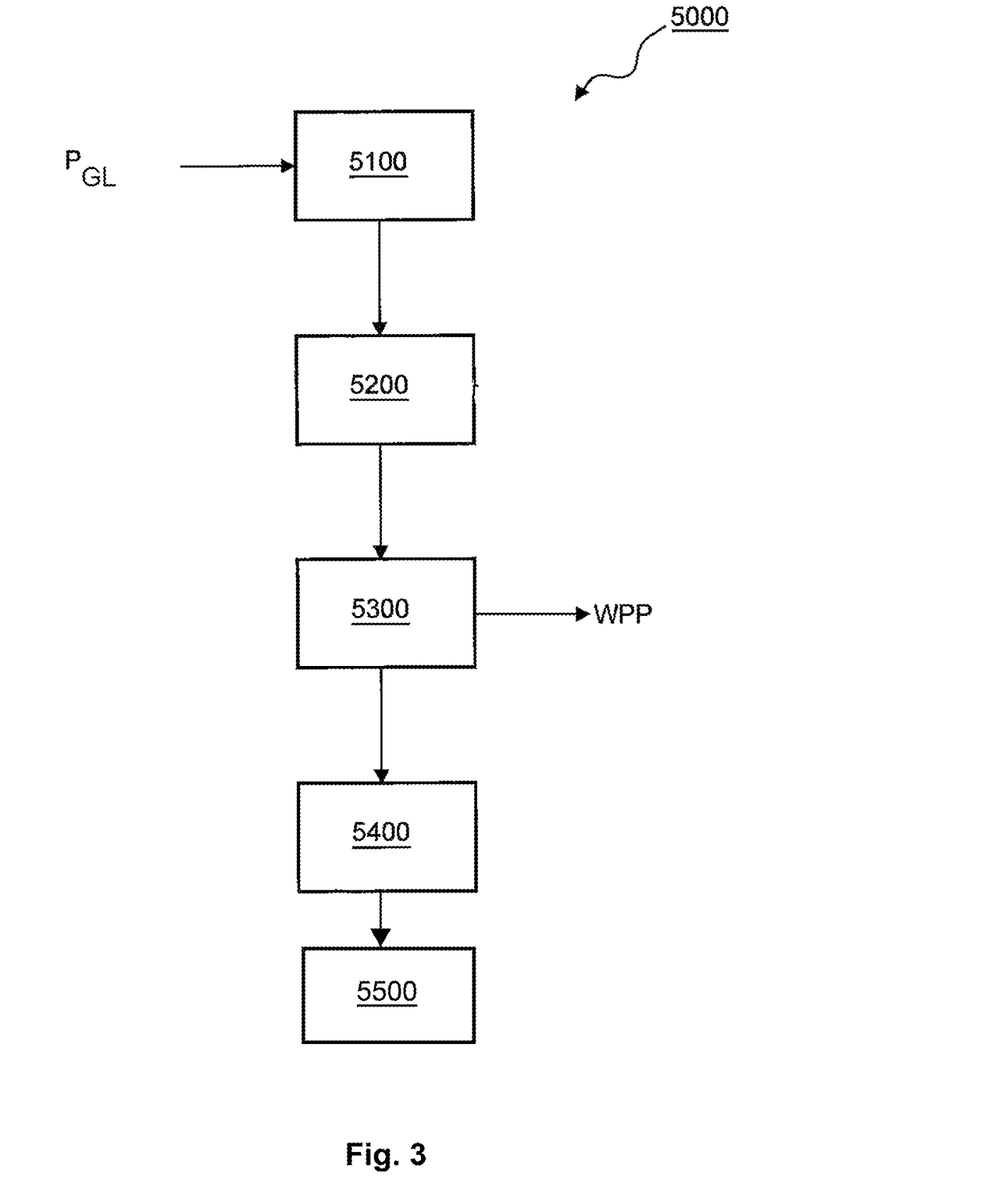
FIG. 3 shows a schematic flowchart of a method according to the invention in one embodiment.

FIG. 3 shows a schematic flowchart of a method 5000 for controlling an electrical distribution grid, in particular as shown below in FIG. 4.

In a first step 5100, at least one variable is determined which describes a state of the electrical distribution grid, for example a load on the electrical distribution grid (grid load for short) PGL by the grid operator.

Thereupon, in a further step 5200, a plurality of electrical installations are combined dynamically to form a virtual power plant.

In addition, in a further step 5300, a control area within the electrical distribution grid is established for this virtual power plant.

On the basis of this, in a further step 5400, a main controller is established.

The main controller then, in a further step 5500, controls the virtual power plant.

Figure 4:
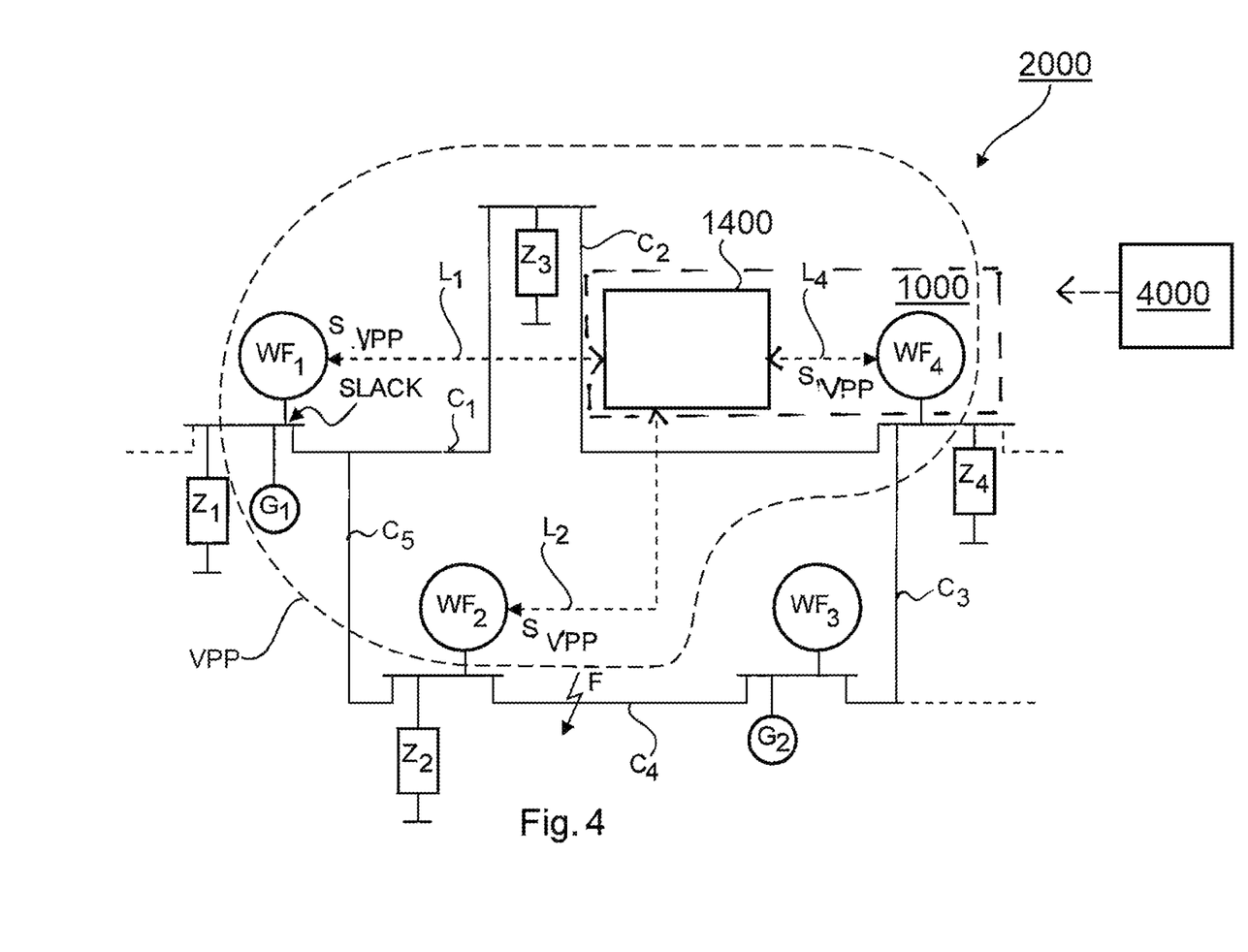
FIG. 4 shows a schematic of an electrical distribution grid having a virtual power plant.

FIG. 4 shows schematically an electrical distribution grid 2000 having a virtual power plant VPP, wherein the electrical distribution grid is controlled by a grid operator 4000.

The electrical distribution grid 2000 comprises a multiplicity of consumers Z1, Z2, Z3, Z4, generators G1, G2 and wind farms WF1, WF2, WF3, WF4, which are connected to one another via electrical lines C1, C2, C3, C4, C5.

The generators G1, G2 are, for example, conventional power plants such as, for example, coal power plants.

The consumers Z1, Z2, Z3, Z4 are, for example, industrial buildings, residential buildings or the like.

The wind farms WF1, WF2, WF3, WF4 are preferably wind farms as shown, for example, in FIG. 2, wherein the wind farms WF1, WF2, WF3, WF4 are physically separated from one another.

In order to control the load flow on the electrical distribution grid, a method as described above is implemented.

In this case, in particular the three wind farms WF1, WF2, WF4 are combined dynamically to form a virtual power plant, and the controller 1400 of the wind farm WF4 (as illustrated in FIG. 2) is established as main controller.

The main controller now preferably controls the virtual power plant by means of setpoint values SVPP, in particular for all of the wind farms WF1, WF2, WF4 of the virtual power plant, preferably at a specific point or control node SLACK in the electrical distribution grid.

The structure of the virtual power plant VPP is in this case dynamic, i.e. over the course of the method, further electrical installations can be added to or removed from the virtual power plant.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

LIST OF REFERENCE SYMBOLS 100 wind power installation
102 tower, in particular of wind power installation
104 nacelle, in particular of wind power installation
106 aerodynamic rotor, in particular of wind power installation
108 rotor blade, in particular of wind power installation
110 spinner, in particular of wind power installation
1000 wind farm
1100 wind power installation, in particular of wind farm
1200 wind farm grid, in particular of wind farm
1300 wind farm transformer, in particular of wind farm
1400 wind farm controller, in particular of a wind farm
1410 command interface, in particular of wind farm controller
1420 grid operator interface, in particular of wind farm controller
1430 control interface, in particular of wind farm controller
1440 measurement interface, in particular of wind farm controller
2000 electrical distribution grid
4000 grid operator
5000 method flowchart
5100 method step
5200 method step
5300 method step
5400 method step
5500 method step
B1, B2, B3 operating modes, in particular of wind farm controller
PGL grid load
Pfarm wind farm power
Pwpi wind power installation powers
SNIS control signals, in particular of wind farm controller
SGO signals, in particular from grid operator
Ugrid voltage of electrical power supply grid
C (electrical) line
G generator
Z consumer
WF wind farms
1, 2, 3, . . . indices
SVPP setpoint values
VPP virtual power plant

The invention claimed is:

1. A method for controlling an electrical distribution grid, the method comprising:
   determining at least one variable describing a state of the electrical distribution grid;
   combining a plurality of electrical installations of the electrical distribution grid to form a virtual power plant;
   establishing a control area within the electrical distribution grid for the virtual power plant;
   establishing a controller of an electrical installation of the virtual power plant as main controller; and
   controlling the control area using the main controller of the virtual power plant.

2. The method as claimed in claim 1, wherein the at least one variable comprises at least one item of information from the following list:
   whether an (n−1) criterion has been met,
   an extension of the electrical distribution grid,
   a present total load on the electrical distribution grid; and
   a present injection within the electrical distribution grid.

3. The method as claimed in claim 1, further comprising:
repeating the following steps:
- determining the at least one variable describing the state of the electrical distribution grid;
- combining the plurality of electrical installations to form the virtual power plant;
- establishing the control area within the electrical distribution grid for the virtual power plant; and
- controlling the control area using the main controller of the virtual power plant.

4. The method as claimed in claim 1, wherein the main controller is configured to preset setpoint values for a plurality of control units, a plurality of generating units, a plurality of consumers systems, and/or a plurality of storage systems within the virtual power plant to control the virtual power plant.

5. The method as claimed in claim 1, wherein the main controller is configured to communicate with a controller of a grid operator or marketer of the electrical distribution grid.

6. The method as claimed in claim 1, wherein the main controller is configured to process at least one of the following parameters from a list comprising:
- operating state of one electrical installation;
- availability and prognosis of the ancillary service to be rendered by an electrical installation;
- present active and/or reactive power of an electrical installation;
- available active power of an electrical installation;
- available reactive power of an electrical installation;
- prognosis of available power and schedule of the control area; and
- SOC (state of charge) value of connected storage systems.

7. The method as claimed in claim 1, wherein the main controller is configured to preset setpoint values for a plurality of controllers taking into consideration at least one of the following values from a list comprising:
- installation power;
- capacity utilization by other ancillary services;
- priority of other ancillary services;
- available active power and/or reserve up to the available power;
- grid sensitivity;
- grid capacity utilization;
- sensitivity at a point to be subjected to closed-loop control;
- sensitivity at a location of the virtual power plant; and
- prognosis of an available power.

8. The method as claimed in claim 1, wherein:
- the plurality of electrical installations is designed as a plurality of wind power installations or a wind farm, and/or
- the combining the plurality of generating units takes place depending on a variable of a control area for which the virtual power plant is responsible.

9. The method as claimed in claim 1, further comprising:
- performing an automatic, topological investigation of the electrical distribution grid with respect to a grid structure, and
- performing switching operations within the electrical distribution grid taking into consideration the topological investigation in such a way that a grid state is maintained.

10. The method as claimed in claim 1, wherein a method for controlling a generator within the electrical distribution grid comprises:
- receiving an electrical location of the control area from the main controller;
- receiving a setpoint value from the main controller, which presets a setpoint value for an active and/or reactive power to be injected;
- determining an electrical distance between the generator and a control node; and
- exchanging an electrical active and/or reactive power with the electrical distribution grid depending on the setpoint value and the electrical distance.

* * * * *